United States Patent
Garcia et al.

(10) Patent No.: US 7,890,706 B2
(45) Date of Patent: Feb. 15, 2011

(54) DELEGATED WRITE FOR RACE AVOIDANCE IN A PROCESSOR

(75) Inventors: David J. Garcia, Los Gatos, CA (US); Michael Knowles, Santa Clara, CA (US); Tom A. Heynemann, Boulder Creek, CA (US); Jeffrey A. Sprouse, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 308 days.

(21) Appl. No.: 10/990,151

(22) Filed: Nov. 16, 2004

(65) Prior Publication Data

US 2005/0223178 A1 Oct. 6, 2005

Related U.S. Application Data

(60) Provisional application No. 60/557,812, filed on Mar. 30, 2004.

(51) Int. Cl.
*G06F 13/14* (2006.01)

(52) U.S. Cl. ............... 711/150; 711/141; 710/244; 714/12; 714/797

(58) Field of Classification Search ............... 711/150, 711/141; 714/12, 797
See application file for complete search history.

(56) References Cited

U.S. PATENT DOCUMENTS

| 4,748,558 | A | | 5/1988 | Hirosawa et al. |
|---|---|---|---|---|
| 4,967,338 | A | | 10/1990 | Kiyohara et al. |
| 5,129,093 | A | | 7/1992 | Muramatsu et al. |
| 5,903,717 | A | * | 5/1999 | Wardrop ............... 714/12 |
| 6,504,785 | B1 | * | 1/2003 | Rao ............... 365/230.05 |
| 7,120,715 | B2 | * | 10/2006 | Chauvel et al. ......... 710/244 |
| 2003/0014598 | A1 | * | 1/2003 | Brown ............... 711/141 |
| 2003/0144828 | A1 | * | 7/2003 | Lin ............... 703/21 |

* cited by examiner

*Primary Examiner*—Yong Choe

(57) ABSTRACT

In a system including multiple-slice processors and memories, a synchronization unit with race avoidance capability includes a delegated write engine that receives data and memory address information from the processors and writes data to the memory as a delegate for the processors.

14 Claims, 9 Drawing Sheets

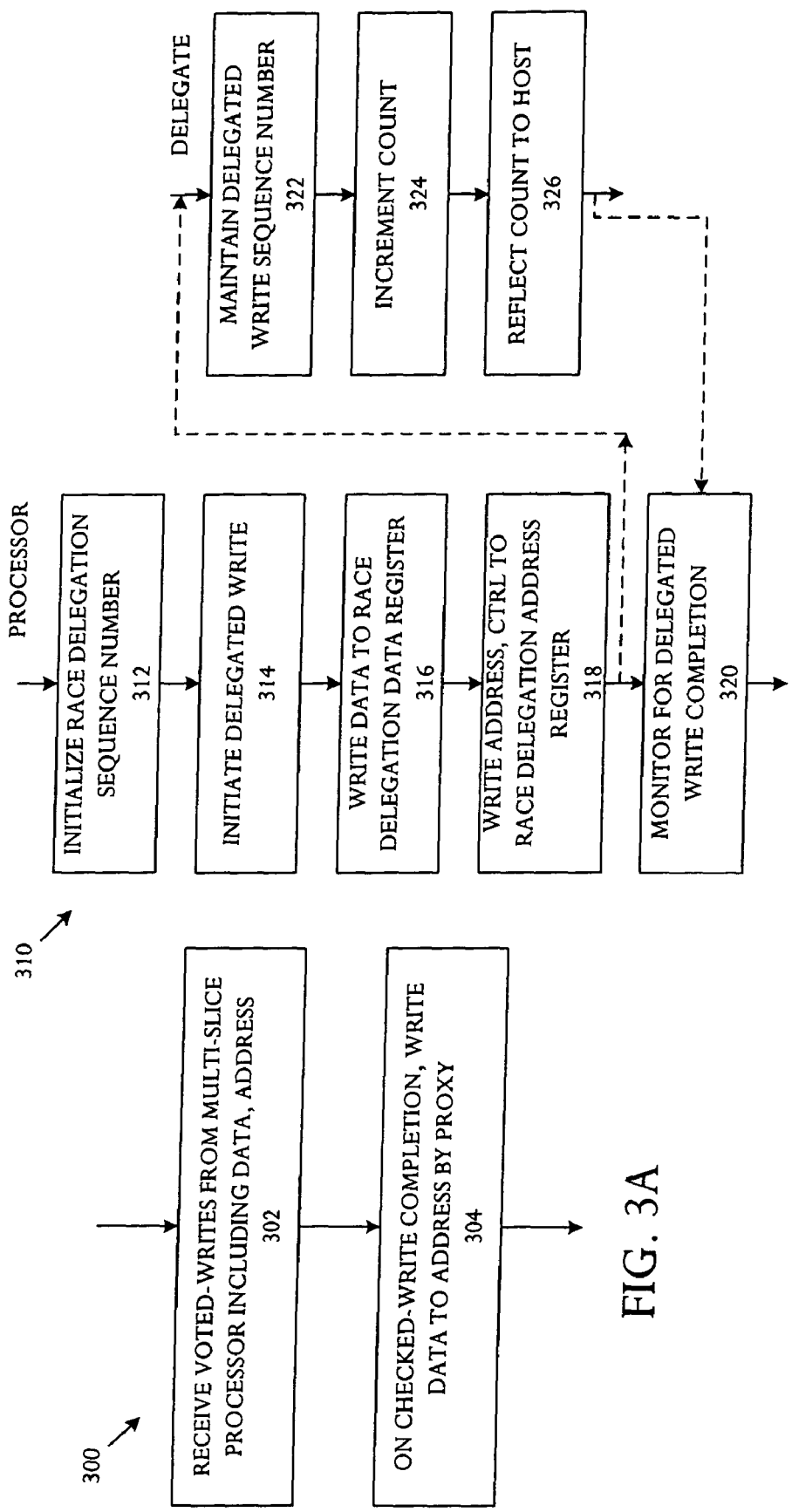

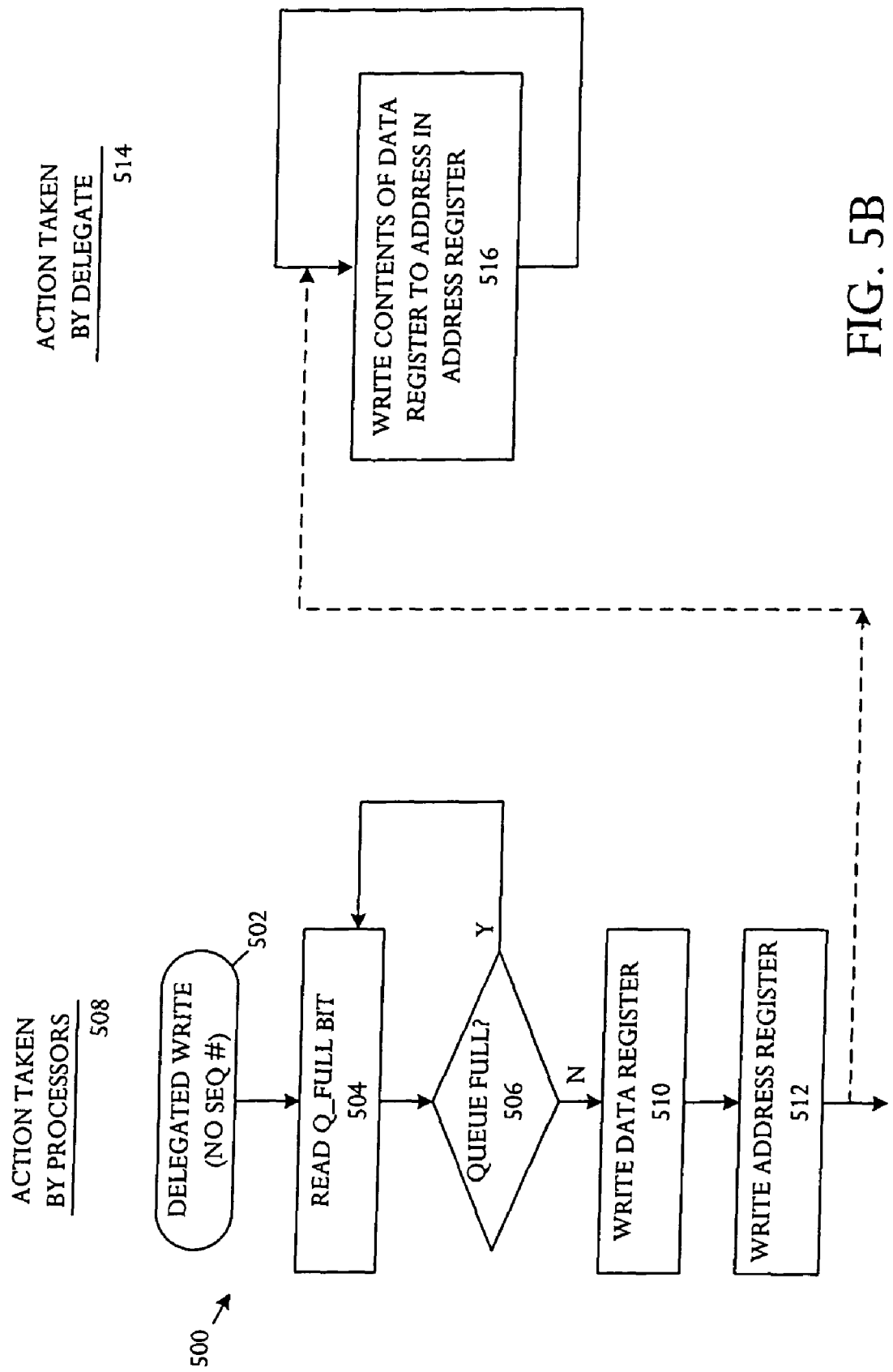

DELEGATED WRITE FOR RACE AVOIDANCE IN A PROCESSOR

BACKGROUND OF THE INVENTION

System availability, scalability, and data integrity are fundamental characteristics of enterprise systems. A nonstop performance capability is imposed in financial, communication, and other fields that use enterprise systems for applications such as stock exchange transaction handling, credit and debit card systems, telephone networks, and the like. Highly reliable systems are often implemented in applications with high financial or human costs, in circumstances of massive scaling, and in conditions when outages and data corruption cannot be tolerated.

A redundant processor architecture can be used for an enterprise system in which multiple physical processors operate as a logical processor, each having dedicated memory and running a copy of a similar operating system. Redundant processors enable desired availability and data integrity characteristics. The redundant processor architecture can be used in an arrangement in which the redundant processors are not tightly synchronized and/or may operate based on a different clock. Such systems have potential for a race condition, for example a processor write-input/output controller read race condition. In one specific example, an input/output controller may read a chain of direct memory access (DMA) descriptors from main memory. The input/output controller may issue read commands to each of multiple memory systems and compares the results. If data matches, the result can be used to generate an input/output operation. However, if the processors append to the chain while the input/output controller is reading the chain, the input/output controller can read the appended value from one processor but not from another, appearing to the input/output controller as a memory miscompare and thus an error.

SUMMARY

In a system including multiple-slice processors and a memory, a synchronization unit with race avoidance capability includes a delegated write engine that receives data and memory address information from the processors and writes data to the memory as a delegate for the processors.

BRIEF DESCRIPTION OF THE DRAWINGS

Embodiments of the invention relating to both structure and method of operation, may best be understood by referring to the following description and accompanying drawings:

FIGS. 3A and 3B are flow charts that respectively depict an embodiment of a method for avoiding a race condition and a usage model for a race delegation function;

FIGS. 5A and 5B are flow charts that illustrate embodiments of techniques implementing delegated or proxy write operations;

DETAILED DESCRIPTION

Figure 1:
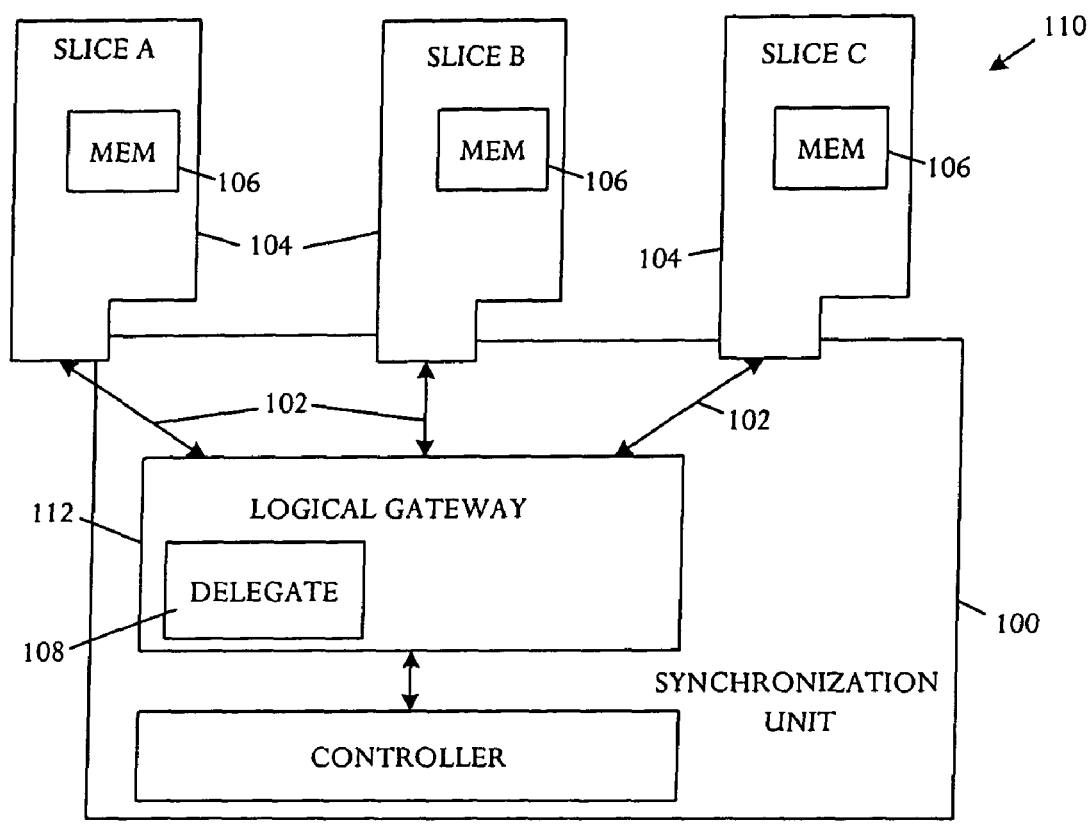
FIG. 1 is a schematic block diagram illustrating an embodiment of a synchronization unit that is capable of avoiding race conditions.

Referring to FIG. 1, a schematic block diagram illustrates an embodiment of a synchronization unit 100 capable of avoiding race conditions that comprises an interface 102 between at least one processor 104 and at least one memory 106, and a delegated write engine 108. The delegated write engine 108 receives data and memory address information from the processors 104 via the interface 102, and writes data to one or more of the memories 106 as a delegate for the processors 104.

The synchronization unit 100 may be used in a redundant loosely-coupled processor (RLCP) 110 and include a logical gateway 112, which may be called a voter module, that includes the delegated write engine 108. The voter module and associated voter logic mutually compares data from the multiple processors to detect any discrepancies and resolve the discrepancies in favor of data in agreement. The delegated write engine 108 can write data to the memory 106 in all participating slices on behalf of the processors 104. The processors 104 perform voted-write operations to the delegated write engine 108 and set two registers, one with a data value and a second with an address value of a location to be written. In the voted-write operation, any discrepancies in the write data from the multiple processors are resolved in favor of the majority. After the write operations complete, the delegated write engine 108 in the logical gateway 112 writes each of the memories 106 with the data value at the address value.

Figure 2:
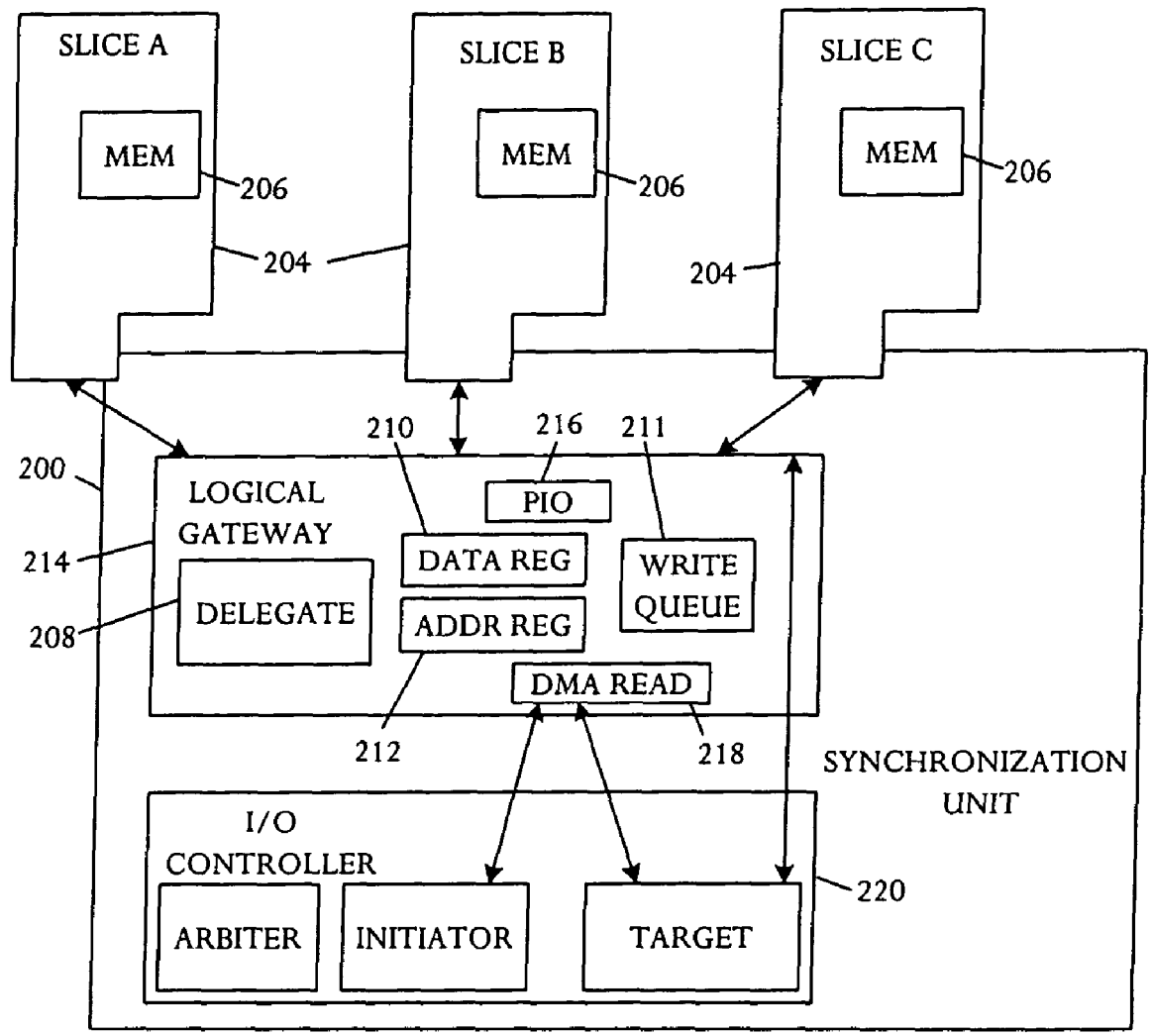
FIG. 2 is a schematic block diagram depicting another embodiment of a synchronization unit with additional detail.

Referring to FIG. 2, a schematic block diagram depicts another embodiment of a synchronization unit 200 that further includes a data register 210 and an address register 212. Processors 204 write data to the data register 210 and address information to the address register 212. A delegated write engine 208, which may alternatively be termed a proxy engine, on completion of the register writes, writes the data to the address specified in the memories 206.

The delegated write engine 208 may include a write queue 211 for managing multiple writes. The write queue 211 functions in combination with the data register 210, the address register 212, and, in some embodiments and configurations, a delegated sequence number register. Information relating to delegated writes is temporarily stored on the write queue 211 to manage write ordering. In general operation, the multiple slices execute the same instruction set so that the host writes from all processors 204 are asynchronously written to the queue 211. Sequence, address, and data information for writes of all processors are queued and used to vote the writes from all slices and handle data accordingly.

The synchronization unit 200 is capable of connecting to one, two, or three processor slices 204 through an input/output (I/O) bus. The synchronization unit 200 can perform multiple functions that facilitate loosely-coupled lock-step operations including input/output voting and resolution of potential race conditions in write delegation. Voting of outbound input/output operations avoids data corruption by detecting lock-step divergence.

In some implementations, the synchronization unit 200 may also include a logical gateway 214 that prevents divergent operations from propagating to the input/output stream. The logical gateway 214 further comprises a Programmed Input/Output (PIO) subunit 216 that controls PIO register accesses and performs voting checks on read and write requests in PIO registers. PIO write traffic is originated by the host processors 204 and can target voted register space in an input/output controller 220, voted register space in the logical gateway 214, and unvoted private registers in the logical gateway 214 and the synchronization unit 200. PIO read traffic also originates at the host processors 204 and can target the same areas as PIO write traffic. PIO read requests to register space in the logical gateway 214 and the input/output controller 220 are voted. PIO read response data is replicated and forwarded to all participating processor slices and is not voted. The logical gateway 214 includes a Direct Memory Access (DMA) subunit 218 that performs Input/Output (I/O) controller-initiated read operations. The processors send checked-write, also called voted-write, operation requests to the delegated write engine 208. DMA write traffic is originated by the input/output controller 220 and is replicated to all participating processor slices 204. The DMA write traffic is not voted. DMA read traffic is also originated by the input/output controller 220. DMA read requests are replicated to all participating slices 204 with no voting. DMA read response data is voted. The Direct Memory Access (DMA) read response subunit 218 verifies input/output controller-initiated DMA operations or responses from memory, and performs checks on read data.

The logical gateway 214 can generate additional write transfers to memory 206, all not voted, including interrupts, all of which are replicated with respect to the target memories 206.

A redundant loosely-coupled processor (RLCP) or system is susceptible to a processor write-input/output controller read race condition. For example, an input/output controller may read a chain of direct memory access (DMA) descriptors from main memory. The input/output controller can issue reads to each of multiple memory systems and compare the results. If the data matches, the result is used to generate in input/output operation. However, if the processors append to the chain while the input/output device is reading the chain, the input/output device can possibly read the appended value from one processor but not from another, a result that would appear to the input/output device or adapter as a memory miscompare and thus result in treatment as an error. The illustrative system enables the input/output device to perform the write operation as a delegate for the processors, eliminating the possibility of a race condition.

The synchronization unit 200 may also include logic in the logical gateway 214 capable of performing a delegated write action that avoids (voting) checking errors resulting from a host write Input/Output (I/O) controller read race condition. The host processors 204 delegate the write operation to the delegated write engine, and the delegated write engine 208 consistently inserts the delegated write into the Direct Memory Access (DMA) stream from the I/O processor to all processors 204 such that the writes are in the same order with respect to the DMA operations to each of the memories.

A host write input/output controller read race may occur in which host slices 204 update a data structure that is read by the logical synchronization unit 200 at various times with respect to the input/output operation. A specific example condition affects direct memory access (DMA) read operations that may coincide with processor write operations. Timing of processor writes may vary between the slices 204, causing the DMA read to return divergent data.

To avoid having a host write input/output controller read race, the logical gateway 214 supports a host memory update function. To avoid voting errors resulting from the host write input/output read race, the processor 204 may delegate the write operation to the logical gateway 214. The logical gateway 214 then inserts the write into the DMA transaction stream at a time that is consistent for all slices 204 in an operation called a delegated write.

Multiple input/output controller 220 usage scenarios may be subject to the host write input/output read race. One usage scenario example is an I/O controller direct memory access (DMA) chain append operation. The I/O controller generates communication request packets and tracks associated response packets. For example, the I/O controller 220 can be used to communicate with a network, for example network 626 shown in FIG. 6A, using network request packets. One step of a DMA chain append operation includes overwriting the previous tail entry chain pointer and end-of-list bit. The write is subject to the race in the functional path. By performing the write using a write delegation function the synchronization unit avoids spurious misvotes when the DMA chain append method is used.

A second example of a usage scenario susceptible to a race condition is an access validation and translation (AVT) table entry update. The AVT resides in memory 206. The AVT table is written by a host processor and is read by an I/O controller. The I/O controller uses the AVT to verify legitimacy of incoming network packets and translate the virtual addresses in the legitimate packets into addresses for memory 206. Host processor software updates the AVT table to perform various operations either alone or in combination including preparing a new entry, remapping a page, enabling permissions to a page, disabling permissions to a page, and the like.

The AVT is written to enable permissions prior to an operation, at a time no legitimate transfers can target a page. Conversely, permissions are disabled after a transfer is deemed complete; again at a time no legitimate transfers target the page. Changing the mapping is only performed on a disabled page, when no legitimate transfers target the page. An illegitimate incoming network packet might arrive just as the AVT is being written, potentially causing a host write/input/output controller read race condition. Performing AVT table updates using the race delegation function may be optional since only errant behavior is affected. However, the race delegation function may also be used to prevent a remote application from causing a voting error.

A third example of a usage scenario susceptible to a race condition occurs when an interrupt manager in the input/output controller 220 performs a synchronization read of a memory. The input/output controller 220 supplies an interrupt mode in which an expanded interrupt vector is placed into the memory and a synchronizing read may be performed prior to the internal register update. Software may manipulate the memory prior to the read operation.

Referring to FIG. 3A, a flow chart depicts an embodiment of a method for avoiding 300 a race condition. The technique includes receiving voted-writes 302 from a multiple-slice, loosely-coupled processor. The voted writes, which may alternatively be called checked writes, specify a data value and a target memory address. Upon completion of the checked-writes, the data value is written by delegation 304 to the address targeted in all memories of participating slices.

Referring to FIG. 3B, a flow chart depicts an embodiment of a usage model for a race delegation function 310. A race delegation sequence number register and a race delegation data register are used to coordinate writing of delegation data. A multiple-slice processor that may function, for example, as a host computer performs voted writes to the race delegation function. Before using the delegated write feature, host software can initialize 312 a race delegation sequence number register in embodiments and configurations that use sequence numbers. The race delegation sequence number may be used to maintain consistency of write ordering between the processors and the delegate. In some implementations or circumstances, a completion notification technique other than a sequence number method may be used. To initiate 314 a delegated write operation, host software can write data 316 to a race delegation data register, thereby setting the data register with a specified data value. Delegated write operation continues with host software writing 318 address, byte enable, and delegate enable to a race delegation address register, setting the address register to the specified target memory address. Host software monitors 320 for completion of the delegated write, based on an assumption that all delegated write operations are handled through a single agent, also called a delegate, which writes the data register content to the address specified in the address register. In some embodiments or operative conditions, software can operate in the host to monitor the sequence number and determine whether additional delegated write resources are available or are currently in use.

Each write operation is written to the queue 211 and the delegate maintains 322 an internal delegated write sequence number that is incremented with each queued delegated write operation. The delegate operates in the logical gateway 214 and increments 324 a count with each performed delegated write. The count is reflected 326 to host memory 206 at a preselected address. The delegate or agent can receive an update from a plurality of processor slices at different times with respect to an input/output (I/O) operation, but enables data consistency by writing the update to the at least one memory with delegation into a Direct Memory Access (DMA) transaction stream.

In some embodiments, the system may use a software sequence number and a hardware sequence number combined with delegated write queue having a set queue depth to enable software to determine the number of delegate writes that can safely be queued.

An example embodiment defines and uses one or more race delegation registers for application to the race delegation function. An embodiment of a race delegation data register that is used to hold data to be written is depicted in Table I.

TABLE I

| Bits | Symbol | Mode | Description |
|------|--------|------|-------------|
| 63:0 | RaceData | R/W | Race Delegation Data - Data to be written. |

A race delegation address register can include several control and status fields and a race address field that holds an address for the delegated write. The control and status fields include a byte enable for a delegated write operation, a delegate queue full bit that is set when all entries for the delegate write queue are full, a delegate queue not empty bit that is set when delegate write queue entries are available, and a delegate enable bit that can be set by software to initiate a delegated write. An embodiment of a race delegation address register is shown in Table II.

TABLE II

| Bits | Symbol | Mode | Description |
|------|--------|------|-------------|
| 63:56 | BE | R/W | Byte Enable - Byte enables for delegated write. |
| 55:39 | Reserved | | Reserved |
| 38:3 | RaceAddr | R/W | Race Address - aligned address for delegated write. |
| 2 | QFull | RO | Delegate Queue Full - Bit is set when all entries of the delegate write queue are full. |

TABLE II-continued

| Bits | Symbol | Mode | Description |
|------|--------|------|-------------|
| 1 | QNotEmpty | RO | Delegate Queue Not Empty - Bit is set when delegate write queue entries are present. |
| 0 | En | WO | Delegate Enable - Bit is set by software to initiate a delegate write. Bit always reads as zero. |

The various modes include read/write (R/W), read only (RO), and write only (WO).

A race delegation sequence number register is initialized prior to delegate write initiation to assist in maintaining order of writes on the write queue. The race delegation sequence number register can have a sequence number field that contains the delegate write sequence number which auto-increments with each delegate write operation, a queue depth field containing the implemented delegate write queue depth, a sequence number address for the sequence number write, and a sequence number write enable bit that enables the delegated write sequence number write. An embodiment of a race delegation sequence number register is shown in Table III.

TABLE III

| Bits | Symbol | Mode | Description |
|------|--------|------|-------------|
| 63:56 | SeqNr | R/W | Sequence Number - Field contains the delegate write sequence number, which automatically increments with every delegate write operation. |
| 55:48 | Qdepth | RO | Queue Depth - Read-Only field containing the implemented delegate write queue depth. |
| 47:39 | Reserved | | Reserved |
| 38:3 | SeqAddr | R/W | Sequence Number Address - aligned host address for the sequence number write. |
| 2:1 | Reserved | | Reserved |
| 0 | En | R/W | Sequence Number Write Enable - Bit enables the delegated write sequence number write. |

Figures 4A, 4B:
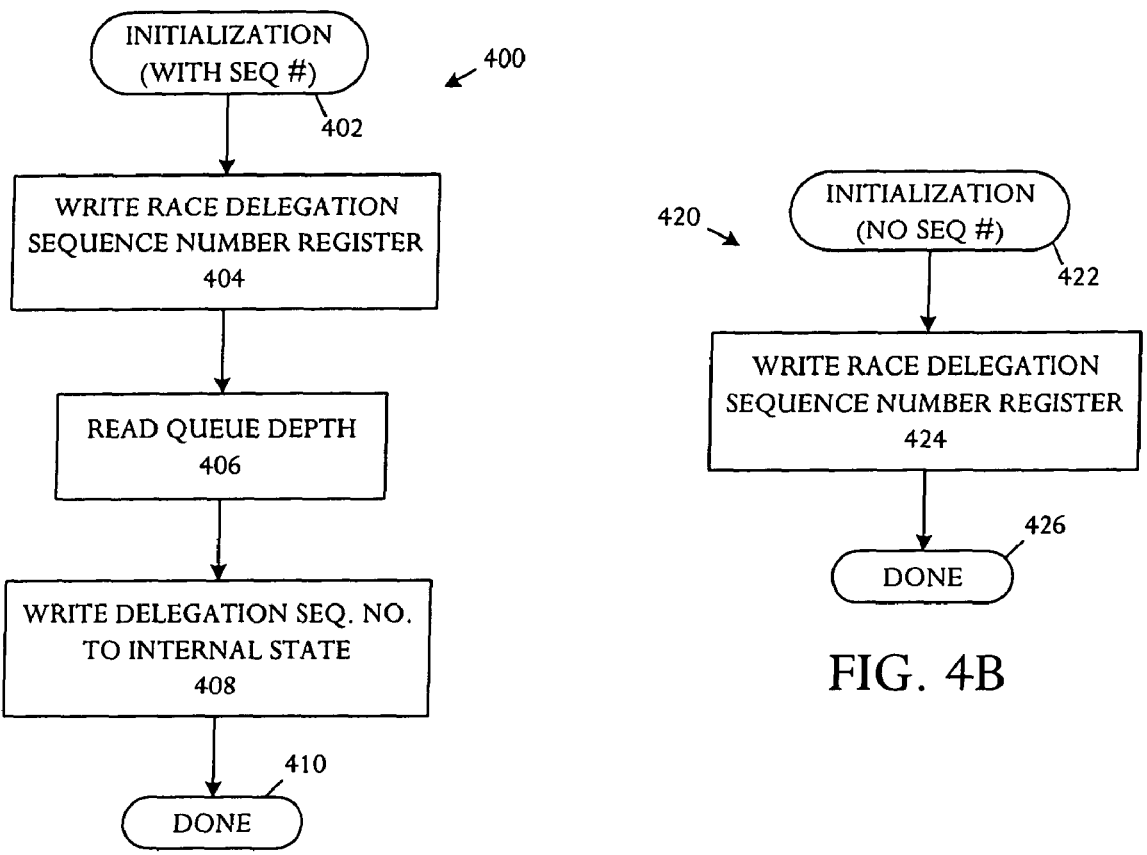
FIGS. 4A and 4B are flow charts depicting embodiments of actions pertinent to race delegation handling that are performed by a processor during initialization.

Referring to FIGS. 4A and 4B, two flow charts depict actions pertinent to race delegation handling that are performed by a processor during initialization. FIG. 4A illustrates actions taken 400 when a sequence number is used 402. Before using the delegated write functionality for the first time, software writes 404 the Race Delegation Sequence Number Register, for example by initializing the delegation engine, writing an initial sequence number SeqNr, setting the address SeqAddr, and setting the enable bit En. The processor reads 406 the queue depth Qdepth, and writes 408 the internal state to a proxy sequence number register. Accordingly, software saves the current race delegation sequence number and the queue depth for later use. For example, CURRENT_PROXY_WRITE_SEQ in the processor memory is written with the proxy sequence number register. Initialization completes 410.

FIG. 4B shows actions taken 420 in circumstances that a sequence number is not used 422, for example when another completion notification technique is desired. Software writes 424 the Race Delegation Sequence Number Register, for example by initializing the delegation engine and resetting or clearing the enable En. Initialization completes 426.

Figure 5A:
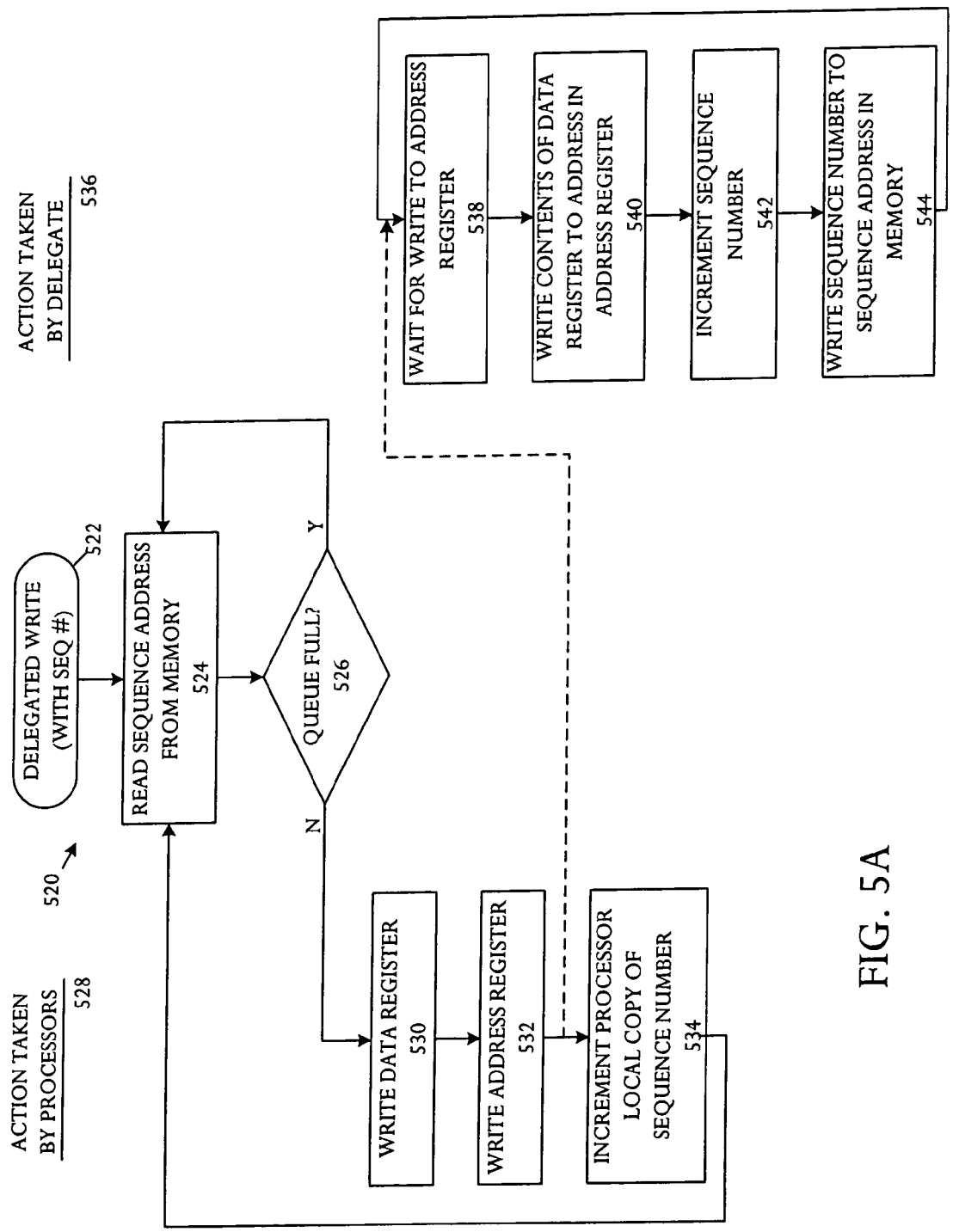

Referring to FIGS. 5A and 5B, two flow charts illustrate embodiments of techniques for performing delegated or proxy write operations. FIG. 5A depicts operation of a delegated or proxy write 520 using a sequence number 522. Actions are performed by processors 528 and by a delegation or proxy engine 536. A sequence address is read 524 from memory. If the queue is full 526, for example if CURRENT_PROXY_WRITE_SEQ is greater than the sequence address number read in action 524 plus queue depth then software waits for a delegated write operation to complete, a condition detected by reading again from memory. If the queue is not full, the processor writes 530 desired data to the Race Delegation Data Register, then writes 532 the address RaceAddr, Byte Enable BE, and Delegate Enable En to the Race Delegation Address Register, actions that initiate the delegated write operation, initiating the action of the delegate 536.

The processor 528 monitors for completion of the delegated write, for example by tracking a count of completed writes or polling the memory location as described hereinafter, or otherwise. The proxy engine writes 540 contents of the data register to the address RaceAddr that is made accessible by the processor write of the Race Delegation Address Register. The proxy engine increments 542 the sequence number, and writes 544 the sequence number to the sequence address in memory.

Monitoring for completion of the delegated write is based on the assumption that all delegated write operations are handled through a single agent. Software maintains an internal delegated write sequence number that is incremented 534 with each enqueued and delegated write operation.

The delegated write engine 536 waits 538 for a write to the address register and increments 542 a count with each performed delegated write. The count is reflected 544 to the processor memory at the defined address.

The internal delegated write sequence number handled by software, the hardware sequence number, and the delegated write queue depth operate in combination to determine the number of additional delegate writes that can safely be enqueued.

FIG. 5B depicts operation of a delegated or proxy write 500 with no sequence number 502. For example, software may poll the memory location for updated data as an alternative to using the sequence number. Alternatively, software may poll a hardware register bit "Q_FULL" until the bit is cleared. Actions are performed by processors 508 and by a delegation or proxy engine 514. Software reads 504 the Q_FULL bit and proceeds if the queue is not full. If the queue is not full 506, the processor writes 510 desired data to the Race Delegation Data Register, and then writes 512 the address RaceAddr, Byte Enable BE, and Delegate Enable En to the Race Delegation Address Register, actions that initiate the delegated write operation in the delegate 514 as shown in the dashed line.

In response to the processor writing 512, the delegated or proxy write engine 514 writes 516 contents of the data register to the address RaceAddr with appropriate bytes enabled BE.

Figure 6A:
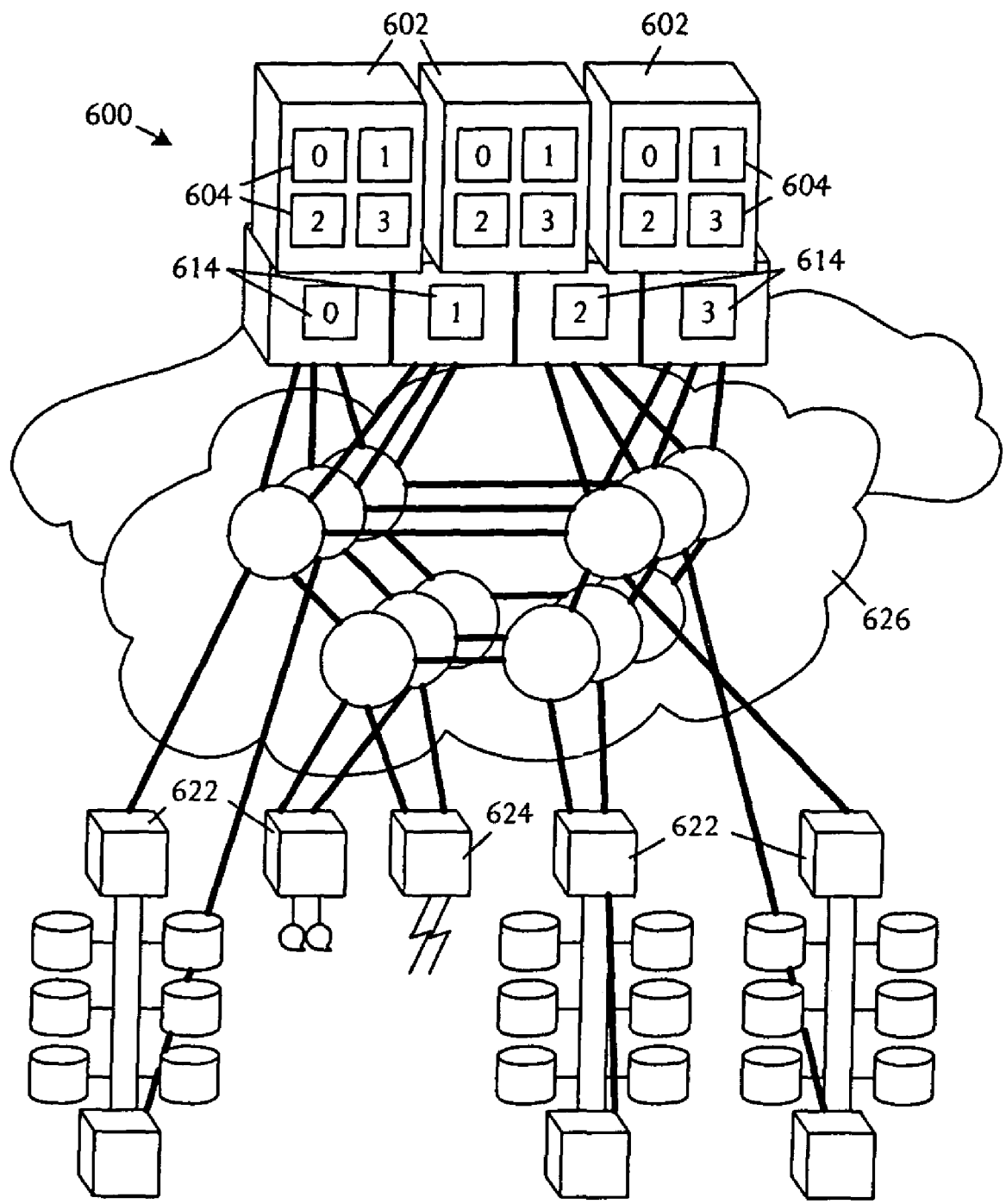
FIGS. 6A and 6B are schematic block diagrams respectively showing embodiments of computer systems capable of implementing the illustrative technique for avoiding race conditions.
Figure 6B:
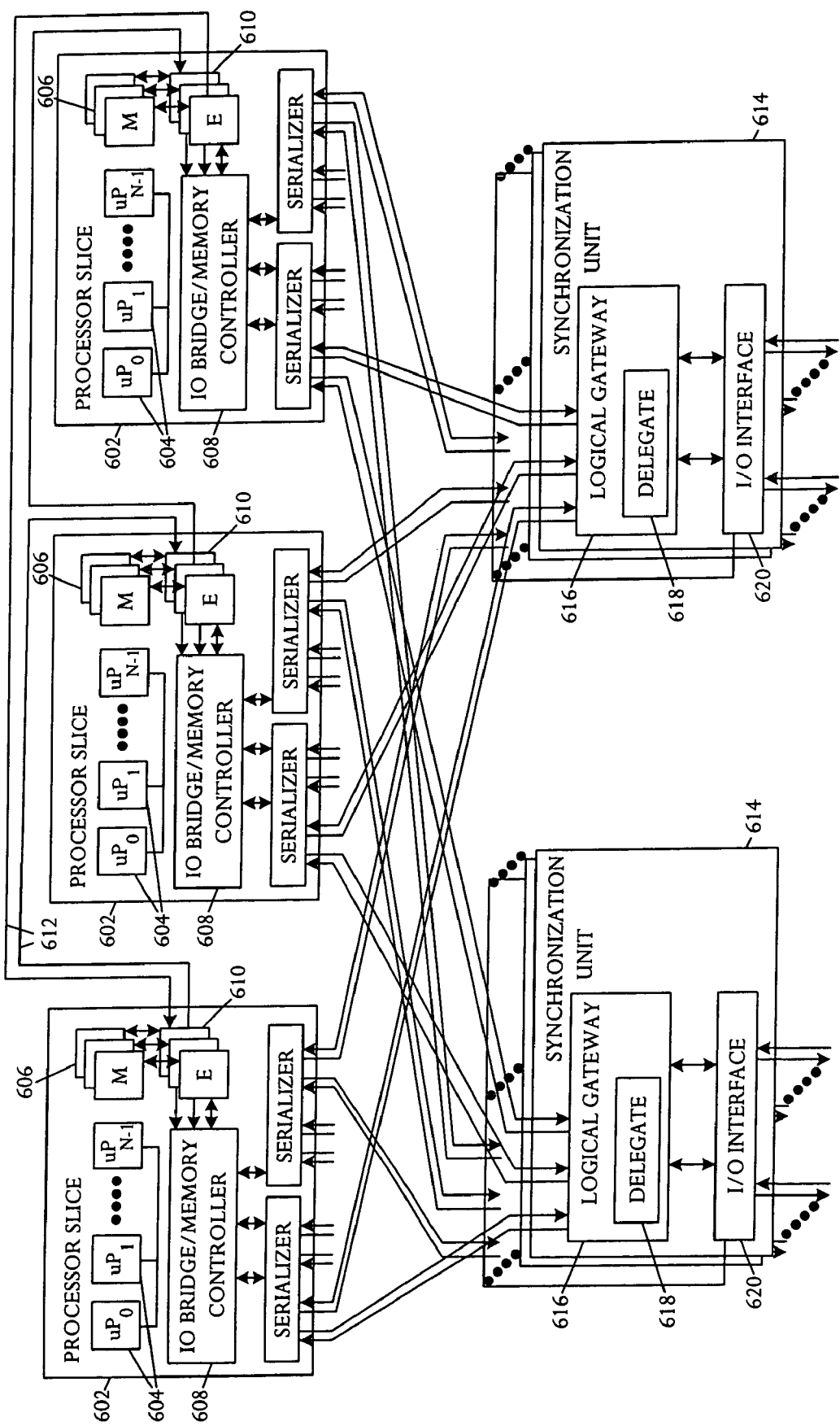

Referring to FIGS. 6A and 6B, schematic block diagrams respectively show an embodiment of a computer system 600, for example a fault-tolerant NonStop™ architecture computer system from Hewlett-Packard Company of Palo Alto, Calif., and two views of an individual processor slice 602. The illustrative processor slice 602 is an N-way computer with dedicated memory and clock oscillator. The processor slice 602 has multiple microprocessors 604, an Input/Output (I/O) bridge and memory controller 608, and a memory subsystem 606. The processor slice 602 further includes reintegration logic 610 and an interface to a logical gateway 616, also called a voter logic.

The computer system 600 includes a plurality of processor slices 602 that are executable in combination as a redundant loosely-coupled processor. Each processor slice 602 further includes a plurality of processors 604 and a memory 606. The computer system 600 further includes at least one logical synchronization unit 614 coupled to multiple processors 604 of the processor plurality in at least two of the processor slices 602. The logical synchronization unit 614 can asynchronously receive data and address information from the multiple processors 604 and synchronously write the data by delegation to an address information-specified address in the memory 606 of the processor slices 602.

Logic in the processors 604 performs voted-write operations to a delegated write engine (delegate) 618 in the logical gateway 616 and initiates a delegated write operation to the memory 606.

The I/O bridge and memory controller 608 functions as an interface between a processor bus and the memory system, and includes multiple interfaces to input and output devices. The I/O bridge/memory controller 608 can be configured to support proprietary interfaces, industry standard interfaces, or a combination interface. In one example, the controller 608 supports the Peripheral Component Interconnect (PCI), PCI Express, or other suitable interface. The I/O bridge/memory controller 608 may be used to interface with a logical synchronization unit (LSU) 614. For a computer system 600 with N logical processors, at least N voters are used so that N input/output links are used. If the number of links is larger than the number supported by the I/O bridge/memory controller 608, then the processor slice 602 can use intermediate fan-out logic to enable separate links to individual voter blocks 616.

In a redundant computer system 600, replacement of a slice involves reintegration whereby the state of the memory is copied to the new slice. Reintegration logic 610 can replicate memory write operations to the local memory and can send the operations across a memory copy link 612 to another slice. The reintegration logic 610 is configurable to accept memory write operations from the memory copy link 612 or from the local memory controller 608. The reintegration logic 610 can be interfaced between the memory controller 608 and memory 606, for example Dual In-line Memory Modules (DIMMs). Alternatively, the reintegration logic 610 may be integrated into the I/O bridge/memory controller 608. Reintegration logic 610 is used to bring a new processor slice 602 online by bringing memory state in line with other processor slices.

The processor slice 602 can supply an internal clock source so that multiple slices are not maintained in tight synchrony. Each microprocessor 604 within different processor slices may run at an independently-selected frequency. Synchronization operations can be used within a logical processor to synchronize the processor elements. Relatively fast processor elements wait for slow elements so that the logical processor runs at the rate of the slowest processor element in the logical processor.

In an illustrative example, the computer system 600 uses loosely lock-stepped multiprocessor boxes called slices 602, each a fully functional computer with a combination of microprocessors 604, cache, memory 606, and interfacing 608 to input/output lines. All output paths from the multiprocessor slices 602 are compared for data integrity. A failure in one slice 602 is transparently handled by continuing operation with other slices 602 continuing in operation.

The computer system 600 executes in a "loose-lock stepping" manner in which redundant microprocessors 604 run the same instruction stream and compare results intermittently, not on a cycle-by-cycle basis, but rather when the processor slice 602 performs an output operation. Loose-lockstep operation prevents error recovery routines and minor non-determinism in the microprocessor 604 from causing lock-step comparison errors. The operation also improves multiple fault tolerance. The system tolerates many multiple failures, even in the same logical processor. Depending on a selectable amount of redundancy, no two processor or fabric failures can stop NonStop applications.

The computer system 600 can be used in network applications. Input/Output (I/O) interfaces 620 in the logical synchronization units 614 enable communication with one or more remote entities such as storage controllers 622 and communication controllers 624 via a network 626.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

Figure 7:
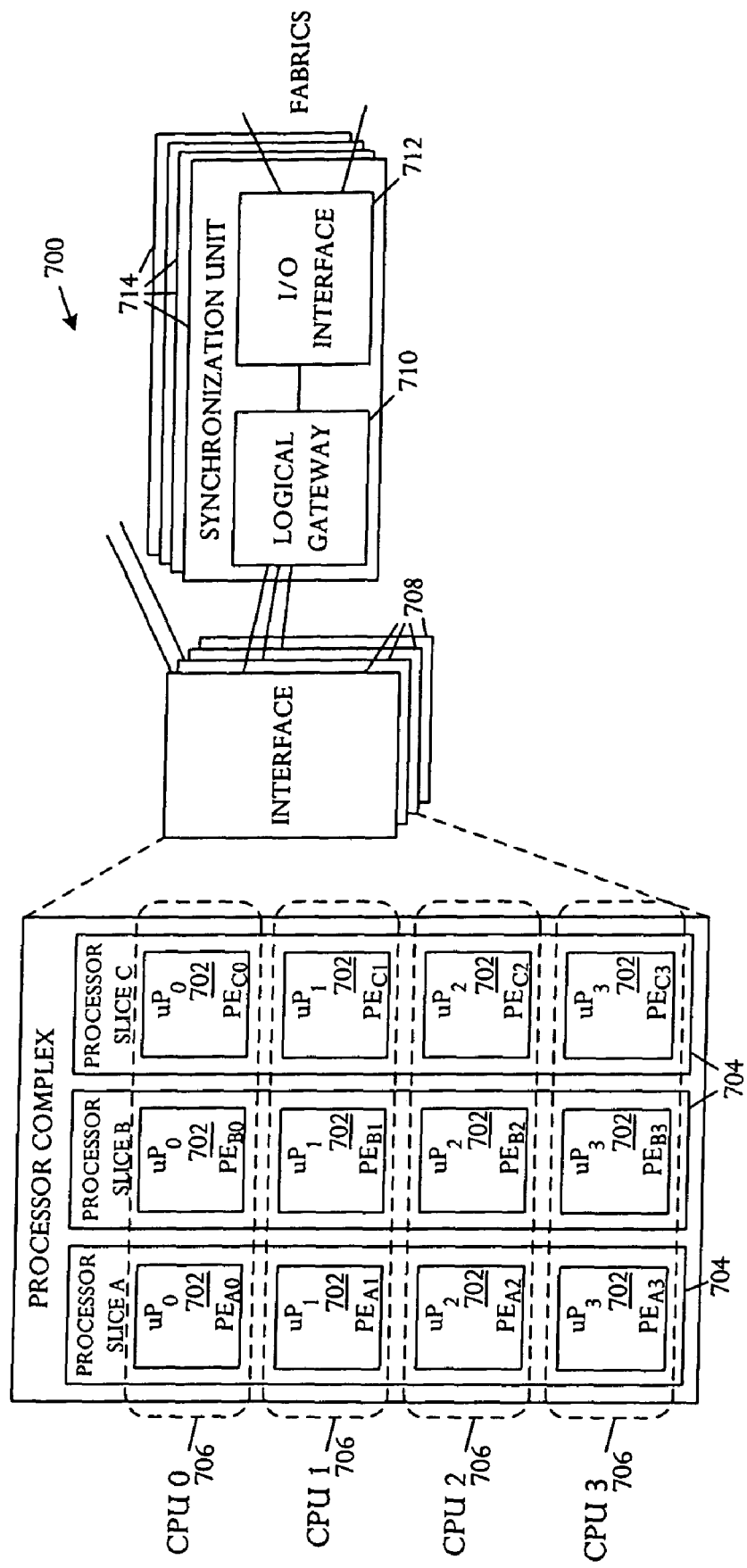
FIG. 7 is a schematic block diagram illustrating an embodiment of a processor complex that includes three processor slices and can implement the technique for avoiding race conditions.

Referring to FIG. 7, a schematic block diagram illustrates an embodiment of a processor complex 700 that includes three processor slices 704, slices A, B, and C, and N voting blocks 710 and Input/Output (I/O) controller 712, for example System Area Network (SAN) interfaces. The number of voting blocks N is greater than or equal to the number of logical processors supported in the processor complex 700. A processor slice 704 is illustratively a multiprocessor computer with contained caches, a memory system, a clock oscillator, and the like. Each microprocessor is capable of running a different instruction stream from a different logical processor. The N voting blocks 710 and N I/O controllers 712 are mutually paired and included within N respective logical synchronization units (LSUs). An illustrative processor complex 700 has one to two logical synchronization blocks per logical processor, with associated voting block unit 710 and I/O controller 712, per logical processor.

During operation, the processor slices 704 A, B, and C generally are configured as multiple tri-modular logical processors that execute in loose lockstep with I/O outputs compared by the voter units 710 before data is written to a network.

The voter units 710 are logical gateways of operation and data crosses from unchecked logical synchronization blocks to a self-checked domain. PIO reads and write requests that address the self-checked domain are checked by the voter unit 710 in order of receipt. Operations are not allowed to pass one another and complete before the next is allowed to start. DMA read response data are also checked in the order received and then forwarded to the I/O controller 712, for example a PCI-X interface. PIO requests and DMA read responses are processed in parallel with no ordering forced or checked between the two streams.

The multiple, for example three, processor elements 702 forming the logical processor 706 are associated with at least one logical synchronization unit (LSU) 714 and system area network (SAN) interface. Voter logic 710 compares output data from the three slices 704 and enables data output operation to complete if the data are equal. One, and only one, logical processor uses each I/O controller 712. Each logical processor has an exclusive, dedicated interface to the SAN.

The logical synchronization unit (LSU) 714 functions as part of a logical processor 706 in a fault tolerant interface to a system area network and performs voting and synchronization of the processor elements 702 of the logical processor 706. In an illustrative implementation, each logical synchronization unit is controlled and used by only a single logical processor 706.

The voter logic 710 connects the processor slices 704 to the I/O controller 712 and supplies synchronization functionality for the logical processor. More specifically, the voter logic 710 compares data from parallel input/output (PIO) reads and writes to registers in the logical synchronization unit from each of the processor elements. The comparison is called voting and ensures that only correct commands are sent to logical synchronization unit logic. Voter logic 710 also reads outbound data from processor slice memories and compares the results before sending the data to the system area network (SAN), ensuring that outbound SAN traffic only contains data computed, or agreed-upon by voting, by all processor elements in the logical processor. The voter logic 710 also replicates and distributes parallel input/output (PIO) data read from the system area network and registers in the logical synchronization unit to each of the processor elements 702. The voter logic 710 further replicates and distributes inbound data from the system area network to each of the processor elements.

Voter logic 710 maintains configuration registers indicating which processor elements 702 are currently members of the logical processor 706. The voting logic 710 ensures all active processor elements 702 in the logical processor 706 participate in the vote. Voting error handling operations may vary according to the number of processor elements 702 in the logical processor 706 and the type of operation. For example, in some conditions the erroneous operation may be completed if all or a majority of the elements agree, or may be aborted if most or all elements disagree. Error recover actions may include stopping the processor element with erroneous data, then reintegrating the element.

Voting operations are performed on parallel input/output (PIO) transfers including processor elements 702 reading and writing symmetric control registers in voter logic 710 or I/O controller 712, and also on direct memory access (DMA) read operations from the I/O controller 712. All outbound data, whether a SAN write operation sourced by the logical processor or an incoming SAN read operation, are DMA reads from the I/O controller 712 to the processor element memories. Data integrity of DMA reads is ensured by the voting operation. On detection of a voting error, the logical gateway 710 halts the error from propagation to the system area network and notifies software executing in the logical processor. The software handles the error.

For symmetric data moving from the logical synchronization unit to the processor element memories, for example inbound Storage Area Network (SAN) traffic writing to the logical processor or PIO reads of symmetric registers, the logical gateway 710 distributes data from the system area network interface to the one, two or three active processor elements 702. Similarly, interrupts from the system area controller 712 are distributed to all processor elements participating in the logical processor 706.

The logical gateway 710 forwards data to the processor element memories at approximately the same time. However, the processor elements 702 do not execute in perfect lockstep so that data may arrive in memory early or late relative to program execution of the particular processor elements 702.

The illustrative system avoids cycle-by-cycle comparison of results from the processor elements and instead performs a "loose lock step" comparison of individual output results from the processor slice memories. On logical processor issue of an input or output operation, the output information from each processor slice memory is compared. Uncorrectable errors in microprocessor, cache, chipset, or memory system eventually cause memory state divergence that can be detected when the logical processor attempts an external input or output operation. Operation of the entire processor, cache, chipset, and memory system are compared, attaining a very high degree of data integrity, a higher degree than can be attained by adding error correcting codes (ECC) to memory or parity to a data bus.

Microprocessor results are not compared every cycle so that no comparison error occurs if one microprocessor repeats a cache fetch to recover from a transient error. Two slices arrive at the same output result, one slightly later than the other. Similarly, minor nondeterministic behavior not affecting program execution, such extra cycle insertion during a memory fetch, does not cause divergence.

All processor slice output information is checked and data is communicated externally only if all active processor slices agree on the output data and operation. If an I/O output operation miscompares, voting logic prevents the output information from going onto the system area network and invokes error-handling logic in the processors. Error handling code enables the operation to proceed, either by allowing hardware to continue with the selected data or by software re-executing the operation, if the error is minor and recoverable. For a non-recoverable error, the errant processor element is identified and can be halted and restarted for a transient error. The processor element is restarted using a reintegration operation. For an error not deemed transient, the processor slice may be scheduled for repair.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed-herein, and will understand that the process parameters, materials, and dimensions are given by way of example only. The parameters, materials, components, and dimensions can be varied to achieve the desired structure as well as modifications, which are within the scope of the claims. Variations and modifications of the embodiments disclosed herein may also be made while remaining within the scope of the following claims. For example, the specific embodiments described herein identify various computing architectures, communication technologies and configurations, bus connections, and the like. The various embodiments described herein have multiple aspects and components. These aspects and components may be implemented individually or in combination in various embodiments and applications. Accordingly, each claim is to be considered individually and not to include aspects or limitations that are outside the wording of the claim.

What is claimed is:

1. A synchronization unit with race avoidance capability in a system including multiple-slice, redundant loosely-coupled processors and memory, the synchronization unit comprising:
    a logical gateway that performs voted-write operations as a delegate for the processors which mutually compares data from the processors and resolves data discrepancies in write data among the processors in favor of a majority of the processors that agree and receives data and memory address information from the processors and writes resolved data to addressed memory as a delegate for the processors; and
    a logic that performs a delegated write action that delegates a write operation to the logical gateway, the logical gateway inserting the delegated write into a Direct Memory Access (DMA) stream at a time consistent for all processor slices whereby order of all delegated writes to each of a plurality of memories is identical.

2. A synchronization unit as recited in claim 1 further comprising:
    a data register; and
    an address register, the processors writing data to the data register and address information to the address register and the logical gateway, on completion of the register writes, writes the resolved data to the address specified in the memory.

3. A synchronization unit with race avoidance capability in a system including multiple-slice, redundant loosely-coupled processors and memory, the synchronization unit comprising:
    a logical gateway that performs voted-write operations as a delegate for the processors which mutually compares data from the processors and resolves data discrepancies in write data among the processors in favor of a majority of the processors that agree and receives data and memory address information from the processors and writes resolved data to addressed memory as a delegate for the processors;
    a race delegation sequence number register; and
    a race delegation data register;
    a logic that sets race delegation sequence, data, and address, and monitors completion of a delegated write;
    a processor-executable logic that maintains an internal delegated write sequence number and increments the internal delegated write sequence number with each enqueued delegated write operation; and
    a delegate-executable logic that increments a count with each performed delegated write, the count being reflected to a host memory at a defined address.

4. A synchronization unit as recited in claim 3 wherein:
    the number of delegate writes that can be enqueued is determined by the maintained internal delegated write sequence number, the delegation logic count, and depth of a delegated write queue.

5. A method of avoiding a race condition comprising:
    receiving checked-writes from a multiple-slice, redundant loosely-coupled processor, the checked writes specifying a data value and a target memory address;

mutually comparing data from a plurality of processors in a voted-write operation;

resolving data discrepancies in write data among the plurality of processors in favor of a majority of the processors that agree in the checked-write;

upon completion of the checked-writes, writing the resolved data value by delegation to the address targeted in at least one memory;

setting a data register with the specified data value;

setting an address register with the specified target memory address;

upon completion of the checked-writes, writing the data register value to the address register specified address receiving an update from a plurality of processor slices at different times with respect to an input/output (I/O) operation; and writing the update to the at least one memory with delegation into a Direct Memory Access (DMA) transaction stream at a time consistent for all processor slices whereby order of all writes to each memory is identical.

6. A method of avoiding a race condition comprising:

receiving checked-writes from a multiple-slice, redundant loosely-coupled processor, the checked writes specifying a data value and a target memory address;

mutually comparing data from a plurality of processors in a voted-write operation;

resolving data discrepancies in write data among the plurality of processors in favor of a majority of the processors that agree in the checked-write;

upon completion of the checked-writes, writing the resolved data value by delegation to the address targeted in at least one memory;

initializing a race delegation sequence number register prior to delegated write initiation; and monitoring the race delegation sequence number register to determine whether delegation resources are available or currently in usage.

7. A method as recited in claim 5 further comprising: initiating a delegated write operation involving:

writing data to a race delegation data register; and writing an address, a data enable signal, and a delegation enable signal to a race delegation address register.

8. A method as recited in claim 5 further comprising: delegating all write operations through a single delegating agent.

9. A computer system comprising:

at least one processor slice executable in combination as a redundant loosely-coupled processor and including a memory;

a logical synchronization unit coupled to the at least one processor slice, the logical synchronization unit asynchronously receiving data and address information from multiple processor slices, performing voted-write operations as a delegate for the processor slices which mutually compare data from the processor slices and resolve data discrepancies in write data among the processor slices in favor of a majority of the processors that agree, and writing the resolved data by delegation to an address information-specified address in the memory of multiple processor slices synchronously among the multiple processor slices; and a logic in the at least one processor slice that checks a delegate write sequence number to determine whether additional delegated write engines are available or currently in use.

10. A computer system as recited in claim 9 further comprising: a delegated write engine in the logical synchronization unit that receives data and address information from the at least one processor slice and writes data to the memory in the at least one processor slice.

11. A computer system as recited in claim 10 further comprising: a logic in the at least one processor slice that performs voted-write operations to the delegated write engine and initiates a delegated write operation to the memory in the at least one processor slice.

12. A computer system as recited in claim 10 further comprising:

a data register;

an address register; and a logic in the at least one processor slice that writes the resolved data to the data register and address information to the address register and the delegated write engine and, on completion of the register writes, writes the data to the address specified in memory in the at least one processor slice.

13. A computer system as recited in claim 9 further comprising: a Programmed Input/Output (I/O) subunit that performs voted checks on read and write requests.

14. A computer system as recited in claim 9 further comprising: a Programmed Input/Output (I/O) subunit that performs voted checks on read data, the at least one processor slice performing checked-write operations to the logical synchronization unit.

* * * * *